United States Patent Office 3,708,319
Patented Jan. 2, 1973

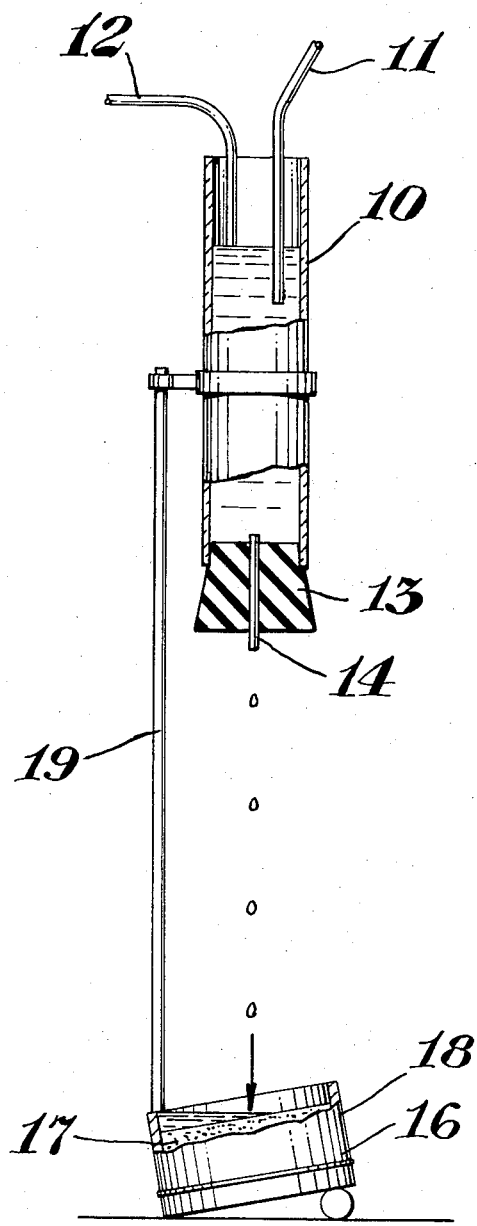

3,708,319
STABILIZING SOILS AND ACCUMULATIONS OF FINE PARTICULATE MATERIAL
Kenneth Hugh Nimerick, Tulsa, and Louis Hugh Eilers, Inola, Okla., assignors to The Dow Chemical Company, Midland, Mich.
Continuation-in-part of application Ser. No. 786,464, Dec. 23, 1968. This application Apr. 3, 1970, Ser. No. 25,363
Int. Cl. C08h 17/02; C09d 3/26
U.S. Cl. 106—253
11 Claims

ABSTRACT OF THE DISCLOSURE

Surfaces of finely divided material, e.g. soils, mine tailings, coal dust, lime, or the like, are stabilized against movement caused by wind and/or water by applying to the surface a drying oil which may optionally contain an accelerator to the drying process and/or a water-swellable polymer.

---

This application is a continuation-in-part of application Ser. No. 786,464, filed Dec. 23, 1968 now abandoned.

BACKGROUND OF INVENTION

Wind and/or water erosion of fine materials such as soils, lime or coal dust or mine mill tailings, particularly those comprising silica-based minerals, causes a serious contamination and pollution problem and frequently creates a direct health hazard, both while being carried by the wind or water and after deposition on surfaces in the vicinity.

For example, in some of copper mining localities such as are found in Western United States and in Chile, such a severe air pollution, health hazard, and lack of freedom from deposits of dust due to wind erosion of mill tailings during dry seasons have occurred that they have seriously disrupted normal living in the vicinity. The dust picked up by winds sweeping across such tailings is at times so severe that it constitutes a hazard to automobile traffic on adjacent highways. Methods of controlling the dust from these tailings have been attempted at the expenditure of millions of dollars, but without acceptable results.

Similarly, surface waters and emerging underground waters have eroded or percolated through the tailings or other contaminating sources and, carrying along materials leached from the tailings or the like, causes extensive harm to plant, animal, and human life, especially at contiguous lower elevations. In this latter regard, many abandoned mines, e.g. in the Appalachian Region of the United States, due to waters passing through and/or over unstable soils, seriously impair the value of otherwise fertile areas.

Tailings, to which reference is made above, are the solids remaining after ore has been removed by flotation operations. The tailings are often, as in the case of copper mine tailings, extremely fine, at least 80 percent thereof usually of a size that would pass through a 100 mesh sieve. The extent and quantity of such tailings are great, an estimate thereof being 105,000 tons of solids being deposited each day on one 5,200 acre settling pond area.

The tailings are built up as a result of solids being pumped at about a 25 to 35 percent solids slurry, from the flotation tanks. The liquid portion of the slurry is substantially drained away from the settling pond and returned to the flotation operation. During dry periods especially in spring and summer, more particularly where these areas dry out and there is appreciable wind, many tons of fines are lifted by and carried into the air.

During periods of heavy rains, the surfaces are eroded, even gutted and tailings as well as natural soils are carried away by water. In roads under construction and in use the difficulties associated with wash-outs due to soil instability are very serious.

Among the efforts to decrease the hazard and pollution resulting from the fines being carried into the air have been the use, by the mining companies, of a device known as a water buggy which sprays water on the dry areas of the accumulation. This operation is usually continued nearly every day of the week for about seven calendar months of the year at a cost, at least in one instance, in excess of $150.00 a day. The result has been unsatisfactory.

In many otherwise desirable habitations in localities in or near desert or semidesert areas, including portions of the Great Southwestern United States, a method of inhibiting the effects of dust and sand storms and hillside erosion is highly desired.

Extensive repairs required as a result of water erosion on railroad right-of-ways and highways and control of countrysides due to wind erosion about cities and resorts and the need to control mine tailings represent a very definite need for an effective method of stabilizing soil and the surface of heaps or piles of fine particle material and indirectly inhibiting all reaccumulation of fine silica, coal, soil, or other powdery material on exposed surfaces in the vicinity and thereby to lessen the amount of such material: that gets on food and in and on machinery and equipment; that discolors buildings and other structures; that is inhaled by animals and people in the vicinity; and that which is washed along by surface waters or carried in percolated water to contaminate potable water sources, fertile soils, and recreational areas. There is also a need to lessen loss of material and contamination due to wind-borne finely powdered inorganic material from storage and supply depots and such materials which, while in transit, are exposed to air currents. Such materials include piles of ash or tailings, of any sort soil, and such bulk chemicals as pulverized limestone, clays, and soft coal such as are conveyed in railway hoppers or gondola cars.

SUMMARY OF INVENTION

The invention comprises spraying or otherwise applying a drying oil to the surface of fine particulate material to prevent the material from being blown about by wind or washed along by water, the practice of the invention thereby inhibiting damage to the surface itself and contamination of the air and surface areas by deposition of gritty or gunky, often health-impairing substances, and being a general deterrent to the healthful enjoyment of life in such affected areas. The oil employed may contain a drying (or oxidizing) agent. It may also contain one or more particulated water-swellable polymers which imbibe water without disintegration.

PRACTICE OF INVENTION

The drying oil and drying oil mixtures may be applied to the surface soil to be treated in a number of different ways. They may be sprayed on, for example, from tank trucks similar to those employed for wetting down streets and highways and the like or they may be sprayed on by hand depending on the size of the area to be treated. They may be sprayed by aerial techniques. Under suitable conditions, helicopters may advantageously be used.

A suitable applicator, e.g. spraying apparatus, for use in the practice of the invention may consist essentially of a hose, pipe, or the like of suitable length and maneuverability and be provided with a nozzle at the outlet end, connected to a source of air under high pressure. A drying oil, e.g. one named in the list below, either alone or emulsified in water or dissolved in a liquid hydrocarbon and optionally containing a drier and/or a polymer, is usually forced through the hose and out the nozzle which is manipulated in such a way as to define a relatively uniform pattern of application on the soil or pile of finely particulated material to provide a film thereon of the material comprising the oil composition. A penetration of about 0.5 millimeter is adequate although the penetration of an average of as much as about 5 millimeters (about ⅛ of an inch) is often effectuated. The amount of drying oil applied, in the practice of the invention, is usually between about 0.001 and 0.5 gallon (usually not over 0.1 gallon) of the oil per square foot of surface of the soil or pile of material being treated. There is no maximum limit for the depth of penetration except that of economy of materials and time.

The drying oil may be diluted in a non-aqueous solvent such as, for example, a specific aliphatic or aromatic hydrocarbon, e.g. toluene, benzene, crude oil, distillate, residuum from refineries, gas oils, melted asphalt, kerosene, amyl acetate, diisopropyl ether, methyl amyl ketone or the like. The solvents generally comprise organic materials having 5 or more carbon atoms, other than alcohols. The degree of dilution can vary and may range from about 1 to about 99 percent by weight of the drying oil based on the weight of the selected solvent. As aforesaid, the drying oil may also be applied to the surface as an oil-in-water emulsion containing from about 1 to about 90 percent by weight of the drying oil. Likewise, drying oils diluted with a solvent as defined before, can be applied as a water emulsion.

The drying oils employed herein comprise those liquid oils which, when applied in a relatively thin layer, have the unique property of forming a continuous and substantially insoluble solid film when exposed to the air and/or to light. One theory concerning the chemistry involved is that these oils contain unsaturated fatty acids which combine with oxygen from the air to form the solid films.

Drying oils suggested for use in the practice of the invention include natural oils, partially synthetic oils, and wholly synthetic oils, among which are:

cashew nut oil
castor oil
china oil
corn oil
fish oil
grapeseed oil
hempseed oil
linseed oil
lumbang oil
mu oil (abrasin oil)
oiticica oil
walnut oil
sardine oil
menhaden oil
dimorphotheca oil
perilla oil
poppyseed oil
rapeseed oil
rubberseed oil
safflower oil
soybean oil
sunflower oil
tung oil
cacohuananche oil
garcia nutaus oil
neat's-foot oil
olive oil
isano oil
kamala oil When the drying oil is used as an emulsion, it is mixed with water, usually employing any well known emulsifying agent. An oil-in-water emulsion is preferred. Emulsions can be from about 10 percent to about 90 percent oil based on the total weight of the emulsion.

When non-aqueous solvents are employed wetting agents can be incorporated into the drying oil treating solution to assist in the coverage of the surface soils which may be damp. Such wetting agents include, for example, nonylphenyl-ethylene oxide adducts, dodecyl benzene sulfonate, diisobutylphenol-ethylene oxide adducts, and other similar agents. These are usually employed in an amount ranging from about 0.02 to 1.0 percent by weight of the drying oil treating solution.

Drying agents may also be included in the drying oil treating solution to accelerate the drying of the oil. Drying agents comprise organic salts (better defined as soaps) comprising di- or multiple-valent metals of unsaturated organic acids. Drying agents possess the power of initiating or otherwise accelerating the rate of drying of drying oils. Soaps which demonstrate drying acceleration of the oils include cobalt, manganese, lead, chromium, iron, silver, zinc, mercury, and aluminum naphthenates, linoleates, oleates, tungstates, stearate, and the like. The unsaturated organic acid salts of a number of other metals in Groups III–A, IV–A, and VIII of the Periodic Table of the Elements may be used but are generally less economic than those above named. Examples of specific drying compounds include cobaltous naphthenate, cobaltous linoleate, cobaltous oleate, cobaltous resinate, cobaltous tungstate, manganese resinate, manganese naphthenate, lead stearate, lead naphthenate, lead linoleate, ferric stearate, ferric resinate, ferrric naphthenate and the like. Reference can be made to the Encyclopedia of Polymer Science and Technology, vol. 5, First edition, Interscience Publishers for a more complete discussion of driers especially pp. 134, 135, and 225. The drying agent is usually employed in an amount preferably less than about 1 percent by weight (based on the weight of the metal present in the drying agent) of the drying oil. The cobalt naprthenate used in all of the following examples consisted of 6% by weight of the cobalt metal portion by weight of cobalt naphthenate dissolved in an organic solvent.

As indicated, particulated water-swellable polymers may also be employed in admixture with the drying oil. The polymers which can be employed are those which will imbibe water without appreciable dissolution or disintegration. Those polymers aid in increasing the permeability of the surface being treated and improving the capacity of the particulate material to retain water. The polymers can be employed in an amount ranging from about 1 to 60 percent, and preferably from about 5 to 30 percent by weight of the drying oil. The polymers employed are slurried in the oil, solvent, and/or emulsion. Examples of suitable polymers include cross-linked acrylamides, and copolymers of acrylamide, vinyltoluenesulfonate, styrenesulfonate, vinylpyrrolidones, oxazolidinones, any of various copolymers and mixtures of homopolymers and copolymers so long as they do not disintegrate as used in the practice of the invention. Trademarked commercial polymers known as Gelgard, Norbak Fines, the less soluble types of Separan, and AM–9 are useful in the practice of the invention.

Preferred treating compositions of the invention comprise on a percent by weight basis:

| | Percent |
|---|---|
| Drying oil | 5–50 |
| Polymer (water imbibing) | Up to 40 |
| Drying oil solvent | 40–95 |
| Drier | 0.01–1.0 |

To aid in retaining the drying oil treating composition on a surface being treated, a previously laid mulch base, e.g. straw, sawdust, moss, or the like, may be used.

The tests and examples set forth hereinafter facilitate a more complete understanding of the present invention. To ascertain specific value for the tests conducted, the test apparatus shown in the annexed drawing was employed.

The apparatus employed in the tests made was of the type depicted in the annexed drawing. It comprises water supply container 10, equipped with water inflow tube 11 and constant head overflow tube 12 so that a constant height of water can be maintained in container 10 during a es. Rubber stopper 13 with hypodermic needle 14 inserted therethrough is positioned in the lower end of container 10. Sample box 18, positioned at an angle from the horizontal contains soil 17 to be tested. Screen 16, of No. 325 mesh, is positioned as shown in the lower part of the box 18 below soil 17. Support member 19 is employed to hold container 10 above the soil being tested so that the soil is directly below hypodermic needle 14. The rate of delivery of the water is controlled by the height of the water in soil container 10. The slant position of box 18 allows water, not penetrating the soil 17, to drain over the edge of soil 17 and to assure that a portion of the soil remains above the water so as to be impinged by the falling drops of water. In each example the efficacy of chemical treatments in accordance with the invention was measured by determining the time required for deforming the surface of the sample soil at the point of drop impact.

EXAMPLE 1

Part A

A treating mixture comprised, by weight, 10 percent of Polymer X (a cross-linked acrylamide which may be partially hydrolyzed) and 90 percent tung oil, diluted with 1 part toluene per 2 parts of the Polymer X-tung oil mixture and 0.1 percent of a nonyl phenol-ethylene oxide adduct and 0.1 percent cobalt naphthenate by weight of toluene. A control area was also tested employing only water for comparison purposes. Soil to be tested in accordance with the invention had a surface area of 90 square inches and the control soil had an area of 30 square inches. The soil consisted of mine tailings containing quartz, feldspar, calcite, muscovite, and clay material (substantially kaolinite, illite and montmorillonite). Both the soil to be used for demonstrating the invention and the control test were thoroughly prewet with water prior to application of the stabilization chemicals. The 90-square inch wetted test surface was treated with an amount of a mixture comprising tung oil containing Polymer X. Thereafter, the treated soil samples were dried under heat lamps at 120° F. for 20 hours. The surface of both the control and example of the invention were jetted with air emitted from a 0.215-centimeter diameter orifice positioned at a 35° angle to the surface of soil sample 17 at the pressures shown in the table below. The following results were obtained:

TABLE

| Test chemical | Air pressure, p.s.i. | | | | | |
|---|---|---|---|---|---|---|
| | 2 | 5 | 10 | 20 | 30 | 40 |
| None (control) | NC¹ | (²) | | | | |
| Mixture of 100 gallons tung oil and ³ 90 pounds of Polymer X per acre | NC¹ | NC¹ | NC¹ | NC¹ | NC¹ | NC¹ |

¹ No change.
² Failed almost immediately (i.e. within a couple of seconds).
³ Polymer X is a particulated cross-linked polyacrylamide usually partially hydrolyzed.

Part B

The surface of the so treated soil 17 was then washed with ⅛ to ¼-inch stream of water emitted at four inches above the more elevated end of the treated surface, allowing the water to run across the sloping soil surface, repositioned at 45° from the horizontal, to discard. The flow rate of the water was 600 milliliters per minute. The control failed again almost immediately, i.e., within a couple of seconds. The area treated according to the invention showed no failure after 10 minutes. After 30 minutes it lost about 20 percent and after 50 minutes, substantially all the soil under direct contact of the jetted water was washed away. The Polymer X-tung oil treatment, therefore, showed excellent resistance to water erosion.

Part C

The soil surface of the sample treated according to the invention was then dried under heat lamps at 130° F. for 4 hours, providing a test surface that was not completely dry but represented soil following a normal drying period subsequent to a heavy rain. The surface was then exposed to simulated raindrops formed by a No. 22 hypodermic needle (positioned as item 14 in the drawing) about 2½ feet above the surface of soil 17, employing the apparatus as defined hereinbefore. The test was conducted for one hour at 50 drops per minute. No erosion occurred during the one hour test. The No. 22 hypodermic needle was then replaced with a No. 18 needle. Using the same head of water, the test surface was again jetted by a constant stream of water from the height of 2½ feet for 0.5 hour. No erosion occurred in the treated surface during this 0.5 hour test.

EXAMPLE 2

Mine tailings as defined in Example 1 were treated in the following manner.

A mine tailings sample, 50 square inches of surface and 2 inches deep, was treated (by means of an atomizing sprayer) with an equivalent of 50 gallons per acre of a fine spray of 70 percent tung oil and 30 percent Polymer X mixture. The Polymer X-tung oil mixture was thereafter diluted in 10 milliliters of toluene with which was admixed 0.2 percent of a polyglycol containing a butyl phenol-ethylene oxide adduct as a wetting agent and 2 percent cobalt naphthenate to accelerate the curing rate of the drying oil. A control sample was prewet with an equal amount of water only. Both the sample for demonstrating the invention and the control sample were dried at 130° F. for 20 hours. Both samples were then tested employing the test apparatus described hereinbefore. Water was applied to the surfaces controlled at a rate of 50 drops per minute by a No. 22 hypodermic needle (item 14). The following test results were obtained:

Type surface treatment:          Results
   None (Control) _____ ¼ inch pocket formed in less than 1 minute.
   50 gallons per acre tung oil-Polymer X slurry __ No change after 8 hours.

The hypodermic needle was then changed from a No. 22 to a No. 18 and the treated surface washed with a steady stream of water from a height of 2½ feet for 1 hour. The surface was not eroded.

The treated surface was left wet over the weekend. The wet surface was thereafter exposed to simulated raindrops formed by a No. 22 hypodermic needle at approximately 2½ feet above the test surface. There were no erosion pockets formed in the sand during 8 hours of continuous testing.

The successful resistance to erosion exhibited by the treated tailings appeared to be due to tung oil-polymer agglomerating the tailings. The presence of the polymer however allowed migration of the water into and/or from the test surface. The treated surface had a gelatinous texture and absorbed the water droplets as they contacted it at the 50 drops per minute rate.

EXAMPLE 3

This example illustrates the practice of the invention wherein no fine particle polymer is employed. A 50-square inch surface 2-inch depth of typical copper mine tailings, was treated with an equivalent of 50 gallons per acre of tung oil, diluted with 10 milliliters of toluene containing 4 percent cobalt naphthenate as a drying agent and 0.5 percent a disec-butyl-phenol-ethylene oxide adduct as a wetting agent. The mixture was applied in the atomizing spray. The surface of the tailings was prewet before application. The test was cured under heat lamps at 120° F. for 24 hours. The surface of the treated tailings was then tested employing the apparatus of the drawing. Simulated water droplets emitted under pressure through a No. 22 hypodermic needle at 2½ feet above the test surface was employed. The water droplet rate was 50 to 70 drops per minute.

There was no indication of erosion after 45 minutes of water drops impinging on the test surface. The treated test surface showed much greater stability against erosion than the control, but the permeability was not so good as when a cross-linked, substantially water-insoluble particulated polymer was present in the treating composition. After four hours of impinging water drops on the tailings surface, there was no erosion at the point of water contact but the tailings appeared less permeable than when the polymer was present and the test surface had become water wet. However, even though the treated surface ultimately became water wet as the test proceeded, there were no signs of water erosion after eight hours.

EXAMPLE 4

Part A

A treating slurry was prepared which consisted of 20 grams of Polymer X in 50 milliliters of tung oil. The slurry was applied to an 81-square inch previously thoroughly water-wet surface of mine tailings by means of the atomizer type sprayer. A control sample (which was not treated) was also prepared. The samples were prewet. The Polymer X-tung oil slurry was applied in an amount equivalent to 100 gallons per acre. The atomizer sprayer provided impinging water at a pressure of about 70 p.s.i. (This pressure is an accelerated test because the impact of rain is less than this pressure.) The so treated sample was placed under heat lamps for three days at a temperature of 130° F. Microscopic observation indicated a well consolidated surface with some cracks. The tung oil polymer mixture was well distributed on the surface.

Thereafter the air jetting test as previously described, was made. The surface of the sample resisted erosion by the air up to 15 p.s.i. but began to move at 20 p.s.i. The control test failed at 10 p.s.i.

Part B

A small amount of water was added to the surface of each of the two samples. That prepared according to the invention hydrated and formed a gelled mass on the surface which was permeable to water. The test surface was highly resistant to water erosion when tested by the splash erosion test with the test apparatus defined hereinbefore. However, the control sample when subsequently tested exhibited no improved resistance to air jetting.

Example 5 with Comparative Tests

A number of additional comparative tests and tests demonstrating the invention were conducted to show the efficacy of the invention and the unsatisfactory performance of other likely materials when attempted to be used to attain the objectives of the invention.

The tests were conducted at between about 90° and 100° F., employing a >325 mesh silica bed, about 1.5 inches deep and 30 square inches in area. After application of the treating material, the bed was subjected to a sweeping wind at between 20 and 30 miles per hour for 14 days. It was at that time wetted down using 150 milliliters of water, and subjection to the wind resumed for another five days. ">325 mesh" means having openings smaller than 44 microns.

In comparative tests A and F, an aqueous solution of sodium silicate was prepared and applied to the bed of pulverulent silica. In comparative test F, 10 percent glycol was admixed with the sodium silicate. In comparative tests C to E and G an aqueous solution of phosphoric acid was employed, either alone or in admixture with sodium silicate or with also a small percent of ferric chloride. In comparative tests H and J a cross-linked polyacrylamide was employed. In comparative tests I and K an asphalt-water emulsion was applied to the pulverulent silica test bed.

In the examples of the invention, either raw linseed oil, boiled linseed oil, or tung oil was employed as the drying oil, at concentrations of substantially 100 percent and at lesser percents down to 50 percent by weight dissolved in kerosene or emulsified with water. In some instances an accelerator to drying (or oxidation of the oil) was included.

The compositions employed in the comparative tests and examples of the invention, identified by the same letter as used in the table, follows:

Comparative Tests (A) 10 percent aqueous solution of sodium silicate.
(B) 20 percent aqueous solution of sodium silicate plus 10 percent glycol.
(C) 10 percent aqueous solution of phosphoric acid plus 0.1 percent ferric chloride.
(D) 10 percent aqueous phosphoric acid.
(E) 20 percent aqueous solution of sodium silicate and 1.0 percent phosphoric acid.
(F) 10 percent aqueous solution of sodium silicate.
(G) 20 percent aqueous solution of sodium silicate and 1.0 percent phosphoric acid, and 0.1 percent $FeCl_3$.
(H 0.25 percent aqueous solution of polyacrylamide.
(I) Asphalitc oil in water emulsion.
(J) 0.125 percent aqueous solution of polyacrylamide.
(K) 50 percent asphaltic oil in water emulsion diluted with 50 percent water.

EXAMPLES (1) Raw linseed oil.
(2) Raw linseed oil containing 1 percent cobalt naphthenate.
(3) Boiled linseed oil containing 1 percent cobalt naphthenate and 0.5 percent cations wetting agent.
(4) Boiled linseed oil.
(5) Boiled linseed oil containing 1 percent cobalt naphthenate.
(6) Boiled linseed oil containing 1 percent cobalt naphthenate and 0.5 percent of nonionic wetting agent.
(7) 50 percent raw linseed oil dissolved in 50 percent kerosene.
(8) 50 percent tung oil dissolved in 50 percent kerosene.
(9) 50 percent boiled linseed oil dissolved in 50 percent kerosene.
(10) 45 percent tung oil and 45 percent kerosene emulsified with 10 percent water.
(11) 10 percent tung oil dissolved in 90 percent kerosene.
(12) 47.5 percent raw linseed oil, 47.5 percent kerosene, and 5 percent cobalt naphthenate.
(13) 47.5 percent tung oil, 47.5 percent kerosene, and 5 percent cobalt naphthenate.
(14) 90 percent boiled linseed oil dissolved in 10 percent kerosene.
(15) 44 percent tung oil, 44 percent kerosene and 2 percent cobalt naphthenate emulsified with 10 percent water.
(16) 45 percent tung oil, 45 percent kerosene, emulsified with 10 percent water, and then diluted with 50 percent water.

Results of the comparative tests and examples, identified by letter or number above, are shown in the table below:

celerator to the oxidation of the drying oil is admixed therewith prior to it being applied to the particulated material.

TABLE

| Test identification | Amount and method of application | Depth of penetration, in. | Efficacy of the treatment |
|---|---|---|---|
| A | 100 ml. poured | 1/4 | Surface crusty and cracked—unsatisfactory. |
| B | do | 1/3 | Cracked and crumbled—unsatisfactory. |
| C | do | 1 N.M. | Soft and unsatisfactory. |
| D | 80 ml. poured | 1 N.M. | Do. |
| E | 100 ml. poured | 1/4 | Surface medium hard and badly cracked. |
| F | 30 ml. sprayed | 1/3 | Cracked and crumbled badly—unsatisfactory. |
| G | 100 ml. poured | 2/3 | Crumbled badly—unsatisfactory. |
| H | 50 ml. poured | 1 N.M. | Failed to consolidate—unsatisfactory. |
| I | do | 1/4 | Crumbled badly—unsatisfactory. |
| J | do | 1 N.M. | Do. |
| K | do | 1/2 | Do. |
| 1 | 30 ml. sprayed | 1/4 | Tacky but flexible crust formed—satisfactory. |
| 2 | do | 1/4 | Do. |
| 3 | do | 1/3 | Crust formed but less firm than in 1 and 2—satisfactory. |
| 4 | do | 1/4 | Tacky but flexible crust formed—satisfactory. |
| 5 | do | 1/4 | Tacky but firm protective crust formed—satisfactory. |
| 6 | do | 1/3 | Tacky but protective crust—satisfactory. |
| 7 | 50 ml. poured | 1/2 | Crust formed but easily crumbled—acceptable. |
| 8 | do | 1/4 | Very hard tough crust formed—satisfactory. |
| 9 | do | 1/4 | Protective but flexible crust formed—satisfactory. |
| 10 | do | 1/2 | Very tough hard crust formed—satisfactory. |
| 11 | do | 1/4 | Crust formed but easily disturbed—acceptable. |
| 12 | do | 1/4 | Rubbery texture crust formed—satisfactory. |
| 13 | do | 1/4 | Rubbery tough crust formed—satisfactory. |
| 14 | do | 1/2 | Satisfactory but easily damaged crust—acceptable. |
| 15 | do | 3/16 | Very tough protective crust formed—satisfactory. |
| 16 | do | 1/8 | Satisfactory crust but easily damaged—acceptable. |

¹ Not measured.

Reference to the examples and the tables setting forth the results obtained show that the practice of the invention is highly effective to allay dust or other particulate or powdery material from being wind-borne to inhibit such materials from being transported by water.

Having described our invention, what we claim and desire to protect by Letters Patent is:

1. The method of stabilizing the exposed surface of fine particulate material against movement and erosion by wind or water and of inhibiting the resulting contamination of the air and water contacting such surface and the deposition of the air- and/or water-borne material on objects and areas leeward to or at lower elevations which comprises applying to said exposed surface a stabilizing composition selected from the class consisting of at least one drying oil, a solution of a drying oil in a hydrocarbon liquid, and a drying oil-in-water emulsion, said drying oil comprising at least about 5 percent by weight of said composition and drying said stabilizing composition after applying it to said exposed surface to form a solid film binding said particulate material.

2. The method according to claim 1 wherein the drying oil employed is tung oil.

3. The method according to claim 1 wherein the drying oil employed is linseed oil.

4. The method according to claim 1 wherein the drying oil is diluted by a hydrocarbon liquid selected from the class consisting of kerosene, gas oil, petroleum distillate, naphtha, crude oil, a pumpable petroleum residuum, and pumpable mixtures of asphalt and a liquid hydrocarbon.

5. The method according to claim 1 wherein the drying oil is emulsified with water to form a continuous phase of the water and a discontinuous phase of the oil and said drying oil comprises from about 10 percent to about 90 percent of said emulsion.

6. The method according to claim 1 wherein an accelerator to the oxidation of the drying oil is admixed therewith prior to it being applied to the particulated material.

7. The method according to claim 6 wherein said accelerator to the cure of the drying oil is cobalt naphthenate.

8. The method according to claim 1 wherein said stabilizing composition contains admixed therewith a water-imbibing, substantially non-water degradable finely particulated polymer in an amount of between about 0.5 and about 60 percent by weight of said stablizing composition to make a pumpable drying oil-polymer slurry.

9. The method according to claim 8 wherein said drying oil-polymer slurry is applied in an amount of between 0.001 and about 0.5 gallon per square foot of surface being treated.

10. The method according to claim 8 wherein said water-imbibing polymer is selected from cross-linked polymers and copolymers of acrylamide, vinyltoluenesulfonate, styrenesulfonate, vinylpyrrolidones, and oxazolidinones.

11. A process for improving the cohesion of a fine particulate soil which comprises: drying a drying oil while on contact with said fine particulate soil to form a solid film binding said soil particles together.

References Cited

UNITED STATES PATENTS

| 2,300,325 | 10/1942 | Van Leeuwen | 61—36 |
| 3,298,982 | 1/1967 | Glenn et al. | 106—287 SS |
| 3,421,584 | 1/1969 | Eilers | 260—29.6 H |
| 2,718,497 | 9/1955 | Oldham | 252—8.5 C |
| 3,297,603 | 1/1967 | Mase | 106—264 |

THEODORE MORRIS, Primary Examiner

U.S. Cl. X.R.

106—287 SS; 260—29.6 H

UNITED STATES PATENT OFFICE
CERTIFICATE OF CORRECTION

Patent No. 3,708,319    Dated January 2, 1973

Inventor(s) K. H. Nimerick and L. H. Eilers

It is certified that error appears in the above-identified patent and that said Letters Patent are hereby corrected as shown below:

Column 3, line 23, change "millimeter" to --milliliter--.

Column 4, line 38, change "naprthenate" to --Naphthenate--.

Column 4, line 46, change "Those" to --These--.

Column 4, line 52, after "emulsion" insert --system--.

Column 5, line 8, after "a" change "es" to --test--.

Column 8, line 48, change "cations" to --cationic--.

Column 10, line 49, after "between" insert --about--.

Signed and sealed this 3rd day of July 1973.

(SEAL)
Attest:

EDWARD M. FLETCHER, JR.  
Attesting Officer

Rene Tegtmeyer  
Acting Commissioner of Patents